INVENTORS
William J. Happel and
Robert Murray, Jr.
BY
*T. H. Murray*
ATTORNEY

INVENTORS
William J. Happel and
Robert Murray, Jr.
BY
ATTORNEY

United States Patent Office 3,404,313
Patented Oct. 1, 1968

3,404,313
TEMPERATURE RESPONSIVE CIRCUIT APPARATUS EMPLOYING THERMISTORS
William J. Happel, Pittsburgh, and Robert Murray, Jr., Monroeville, Pa., assignors to Power Control Corporation, Pittsburgh, Pa., a corporation of Pennsylvania
Filed Feb. 4, 1966, Ser. No. 525,031
7 Claims. (Cl. 317—41)

ABSTRACT OF THE DISCLOSURE

Described is circuit apparatus for actuating an alternating current switch in response to an increase in temperature above a predetermined limit. This is accomplished by circuitry including thermistors in parallel for producing an output signal whenever the temperature of any one of the thermistors rises above a predetermined limit, and including means for sensing an off-normal condition, other than excessive temperature, at any one of a plurality of locations.

---

While the invention described herein is useful in any application where it is necessary to sense an over-temperature condition, it finds particular utility in the protection of dynamoelectric machines against overheating. In the past, systems such as those shown in U.S. Patents Nos. 3,036,242 and 3,079,524 have been employed for protection against overheating in electrical motors and the like. In general, it can be said that they employ overtemperature sensing elements comprising a temperature sensitive resistance device having a low temperature coefficient of resistance in the normal operating temperature range of the device to be protected, but a very high temperature coefficient when the temperature exceeds the safe operating temperature. Thus, should the temperature of the resistance element rise above a predetermined limit, its resistance increases abruptly.

According to the teachings of the aforesaid patents, a number of such temperature sensing elements, usually called "thermistors," are embedded in the motor windings or placed in intimate contact with the device to be protected. These sensing elements, energized by a source of direct current potential, are all connected in series with the energizing coil of a direct current relay, the arrangement being such that when the resistance of one or more of the thermistors rises upon the occurrence of an overheating condition, the current through the relay will drop to the point where its normally open contacts again open. These contacts, in turn, are in the energizing circuit for a main line contactor or the like for the dynamo-electric machine such that power to the machine will be cut off upon occurrence of the overheating condition.

While the foregoing system has found relatively widespread use, it has certain inherent disadvantages. First, since the temperature responsive resistance elements are connected in series with a control relay, the number of temperature responsive elements and, hence, the number of separate areas which can be protected, is limited. The reason for this is that in order to deenergize the control relay, the total resistance of the series circuit must rise by a specified amount. Consequently, as the number of thermistors in a series circuit is increased, the effect of a change in resistance of any one thermistor on the total series circuit resistance decreases. Secondly, the use of a mechanical relay as a control element presents the usual problems of dirty contacts or sticking which may occur from time-to-time. Thirdly, the use of thermistors in series seriously limits the response of the circuitry for the reason that the effect of a change in resistance of any single thermistor is dependent upon the total circuit resistance.

As an overall object, the present invention seeks to provide circuit apparatus for sensing an overtemperature condition at any one of a plurality of locations, which apparatus overcomes the foregoing and other disadvantages of prior-art circuitry of this type.

Another object of the invention is to provide circuit apparatus for generating an output signal in response to an increase in temperature above a predetermined limit at any one of a plurality of locations with the use of temperature responsive impedance elements, each of which is adapted to produce an output signal indicative of an overtemperature condition independently of the other elements of the system.

Another object of the invention is to provide an overtemperature protective system which employs solid-state circuit elements only, thereby eliminating mechanical relays and their attendant problems.

A further object of the invention is to provide an overtemperature protective system which will remain activated to indicate an overtemperature condition once a predetermined temperature is reached even though the temperature of the device may fall below its safe operating temperature. This prevents reactivation of the device before the fault causing the overtemperature condition has been corrected.

Still another object of the invention is to provide a protective and/or control circuit system in which a single solid-state relay device can be used to indicate an overtemperature condition as well as other off-normal conditions or control parameters.

In accordance with the invention, a plurality of temperature responsive impedance devices are connected in a plurality of effective parallel current paths between the output terminals of a source of energizing potential, each of the effective parallel current paths including an associated one of the temperature responsive impedance elements in series with an impedance element which is substantially insensitive to temperature variations. By connecting the junction of the two impedance devices in each separate current path to the input of bistable circuit means through a unidirectional current device, the bistable circuit means will switch from one stable state to the other to indicate an overtemperature condition whenever the temperature of any one of the temperature responsive devices rises in response to an overtemperature condition. Thus, whereas prior-art systems of this type were limited in the number of temperature responsive impedance elements which could be used in a series circuit arrangement, the present invention provides a means whereby the number of temperature responsive impedance elements is essentially unlimited since each operates independently of the others. As will be seen, the invention also enables activation of the bistable circuit means in response to off-normal conditions other than overtemperature with a very slight addition to the circuitry.

Preferably, and assuming that the system is used for the protection of a dynamoelectric machine, the aforesaid bistable circuit means is used to cut off a semiconductor controlled rectifier arranged in an alternating current bridge such that the bridge will normally conduct current to the energizing coil of a main line contactor, but will be blocked when the semiconductor controlled rectifier is cut off upon the occurrence of an overtemperature condition. Thus, whenever an overtemperature condition occurs at any one of a plurality of locations, the alternating current bridge is blocked, and the main line contactor becomes deenergized to remove the power source from the dynamoelectric machine.

The above and other objects and features of the invention will become apparent from the following detailed description taken in connection with the accompanying drawings which form a part of this specification, and in which.

Figure 1:
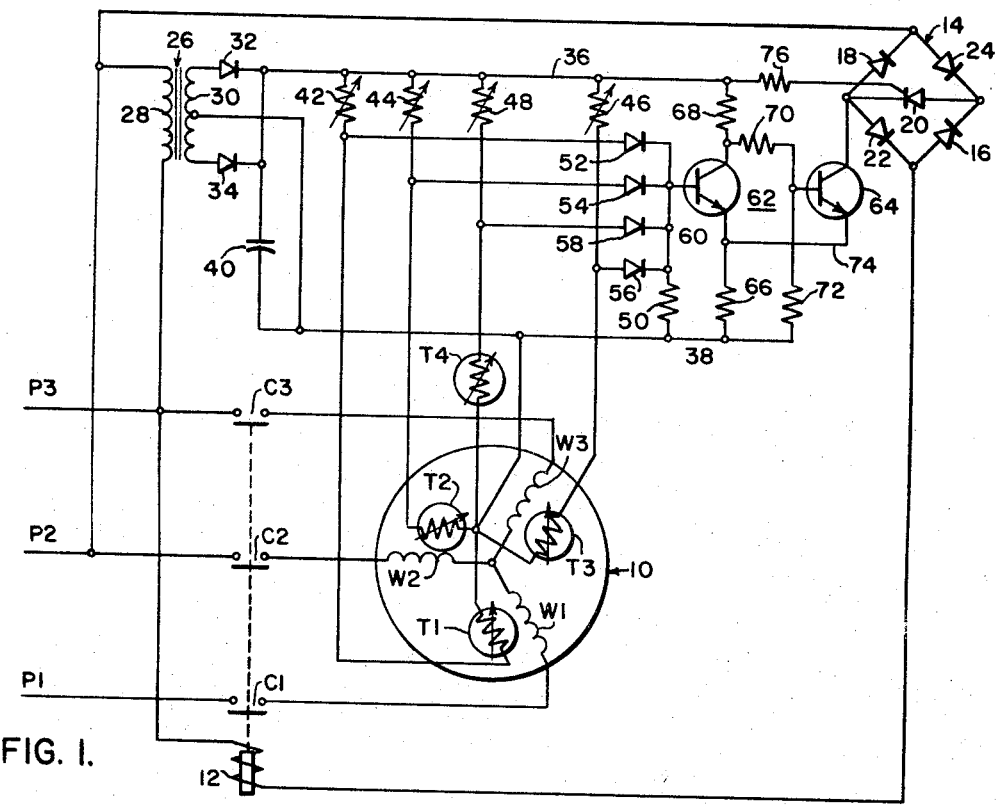
FIG. 1 is a schematic illustration of one embodiment of the invention as applied to an overheating protection system for a dynamoelectric machine and employing a Schmitt trigger circuit as a switching means.

With reference now to the drawings, and particularly to FIG. 1, a dynamoelectric machine, such as an electric motor, is schematically illustrated and identified by the reference numeral 10. The motor 10 includes three windings W1, W2 and W3 connected to the three phases or leads P1, P2 and P3 of a three-phase source of alternating current power, not shown. The main line contactor for the motor 10 is shown having three contacts C1, C2 and C3 in the three phases or leads P1, P2 and P3, respectively, and having an energizing coil 12. This coil 12 is normally energized from the leads P2 and P3 through an alternating current bridge 14.

During one-half cycle of the alternating current power source, current will flow through diodes 16 and 18 and a silicon controlled rectifier 20 in the bridge 14. On the other half cycle, current will flow through diode 22, the silicon controlled rectifier 20, and diode 24. Rectifier 20 is of the type which normally conducts as long as current flows between its gate electrode and cathode. Thus, assuming that the rectifier 20 is conducting, alternating current will be supplied to the energizing coil 12 to hold the contacts C1–C3 closed. However, should the rectifier 20 cut off, coil 12 will become deenergized and contacts C1–C3 will open to disable the motor 10.

Figure 4:
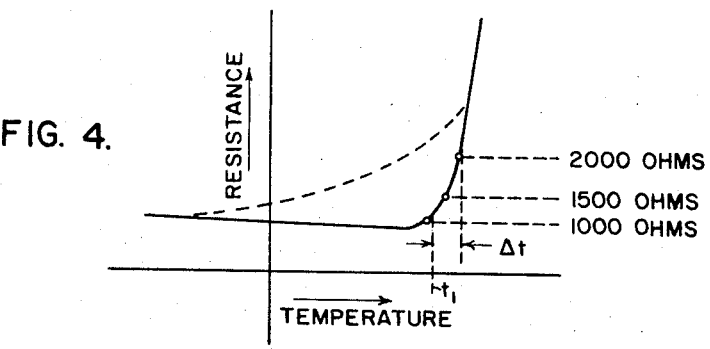
FIG. 4 is a graph illustrating the relationship between temperature and resistance in representative thermistors used in the invention.

In intimate contact with the motor windings W1, W2 and W3 are three thermistors T1, T2 and T3, respectively. A fourth thermistor T4 may, for example, be in contact with a bearing housing for the motor to determine an overheating condition of the bearing. As was mentioned above, the thermistors T1, T2, T3 and T4 have positive temperature coefficients of resistance above a predetermined temperature value. This is illustrated by the graph of FIG. 4 comprising a plot of temperature versus resistance for a representative thermistor. The resistance remains relatively constant until a temperature, $t_1$, is reached, at which point the resistance increases abruptly. Temperatures below $t_1$ are within the normal operating range of the windings or the bearing, as the case may be. As will be understood, the temperature at which the resistance begins to rise rapidly for any given thermistor can be preselected by selecting the desired composition of the material from which it is formed.

The thermistors T1–T4 are utilized in protective circuitry including an input transformer 26 having its primary winding 28 connected across leads P2 and P3, substantially as shown. The opposite ends of the secondary winding 30 of transformer 26 are connected through diodes 32 and 34 to a first power lead 36; while a center tap on the secondary winding 30 is connected to a second power lead 38. The cathodes of diodes 32 and 34 are also connected to the lead 38 through capacitor 40. It should be immediately apparent that the combination of elements 30, 32, 34 and 40 comprises a full-wave rectifier which produces a direct current voltage between the leads 36 and 38, the lead 36 being positive with respect to lead 38.

Connected between the leads 36 and 38 are a plurality of essentially parallel current paths, each of which includes an associated thermistor T1–T4 in series with an impedance element which is essentially insensitive to temperature variations. Thus, a first current path includes the thermistor T1 and variable resistor 42; a second current path includes thermistor T2 and variable resistor 44; a third current path includes thermistor T3 and variable resistor 46; and a fourth current path includes thermistor T4 and variable resistor 48. The junction between each thermistor and its associated variable resistor in the respective parallel current paths is connected through a diode and resistor 50 to the negative power lead 38. Thus, the junction of elements T1 and T2 is connected to resistor 50 through diode 52; the junction of elements T2 and 44 through diode 54; the junction of elements T3 and 46 through diode 56; and the junction of elements T4 and 48 through diode 58. Should the resistance of any one or more of the thermistors T1–T4 increase abruptly as upon the occurrence of an overtemperature condition, the voltage at the cathodes of the diodes 52–58 will increase in the positive direction, thereby indicating that an overtemperature condition has occurred.

The cathodes of the diodes 52–58 are connected to the base of an NPN transistor 60 in a Schmitt trigger circuit 62 which also includes a second NPN transistor 64. As shown, the emitter of transistor 60 is connected to lead 38 through resistor 66; while its collector is connected to lead 36 through resistor 68. The collector of transistor 60 is also connected to lead 38 through resistors 70 and 72, the junction of the two resistors 70 and 72 being connected to the base of transistor 64. The circuit is completed by means of an interconnection 74 between the emitters of the two transistors 60 and 64.

As is known, the Schmitt trigger circuit 62 is a type of multivibrator which will shift from one stable state to another when the level of an input signal voltage exceeds a predetermined triggering level. The circuit remains in one of its two stable states until the input voltage rises above the aforesaid predetermined level, whereupon it will switch to its other stable state. When the input voltage falls below the aforesaid predetermined triggering level, the circuit switches back into its original stable state and will remain in that state until the input voltage again rises above the triggering level.

Under normal conditions, the NPN transistor 60 is cut off while the transistor 64 conducts. It will be noted that the collector of transistor 64 is connected to the cathode of silicon controlled rectifier 20; while the gate electrode of this same rectifier is connected to the lead 36 through resistor 76. Under the conditions assumed with transistor 64 conducting and transistor 60 cut off, the rectifier 20 will conduct and energizing coil 12 of the main contactor will be energized to close contacts C1 through C3 such that power is supplied to the motor 10.

Each of the four parallel current paths between leads 36 and 38 comprises a voltage divider. The voltage at the junction of thermistor T1 and variable resistor 42, for example, will normally be below the predetermined triggering level of transistor 60. Should, however, the resistance of thermistor T1 rise abruptly due to an increase in the temperature of winding W1, for example, the voltage at the junction of elements T1 and 42 will rise in a positive direction. At the same time, the voltage at the upper end of resistor 50 will rise above the triggering level of transistor 60. Therefore, transistor 60 will now conduct while transistor 64 cuts off, thereby cutting off the silicon controlled rectifier 20 to deenergize the coil 12 and open contacts C1–C3. Similarly, if the resistance of either the thermistor T2 or thermistor T3 should rise abruptly due to an overtemperature condition, the voltage on the base of transistor 60 will rise in the positive direction, whereupon the transistor will conduct to cut off rectifier 20 until the overtemperature condition is corrected.

It will be noted that each of the thermistors T1 through T4 operates independently of the others. That is, a rise in resistance due to an overtemperature condition at any one of the locations of the thermistors will give rise of an increase in voltage on the base of transistor 60, and this regardless of the condition of the other thermistors involved. Furthermore, the point at which any thermistor will cause the transistor 60 to conduct can be regulated by varying the resistance of its associated variable resistor 42–48 in the aforesaid voltage divider arrangement. It can be seen, therefore, that the present invention provides a means whereby the operation of any one thermistor is not dependent upon the number of other thermistors in the circuit and that due to the use of an alternating current bridge 14, all mechanical relays are eliminated in the control circuitry.

Figure 2:
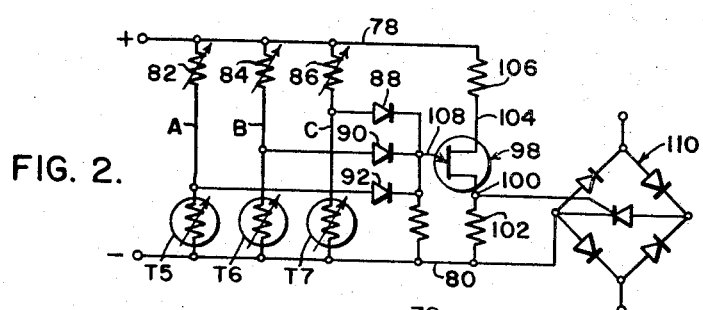
FIG. 2 is a schematic diagram of another embodiment of the invention employing a unijunction transistor as a switching element.

With reference now to FIG. 2, another embodiment of the invention is shown in which three effective parallel current paths A, B and C are connected between leads 78 and 80 having a source of direct current potential applied thereto with the polarity shown. Each parallel current path A, B or C, in turn, includes an associated thermistor T5, T6 or T7 in series with an associated variable resistor 82, 84 or 86. As in the embodiment of FIG. 1, the junction between each thermistor and its associated variable resistor is connected to lead 80 through diode 88, 90 or 92 and a resistor 94. In this case, however, the Schmitt trigger circuit of FIG. 1 is replaced by a unijunction transistor 98 having a first base electrode 100 connected to lead 80 through resistor 102 and a second base electrode 104 connected to lead 78 through resistor 106. The emitter 108 of the unijunction transistor 98 is connected to the cathodes of diodes 88, 90 and 92. Hence, the voltage on this emitter will rise in a positive direction whenever the resistance of thermistor T5, T6 or T7 rises due to an overtemperature condition. After the voltage on the emitter 108 exceeds a predetermined limit due to an abrupt increase in the resistance of any one of the thermistors, the unijunction transistor 98 will conduct, whereupon the voltage on its first base 100 will increase in the positive direction. This increase in voltage can be used, for example, to turn-on a silicon controlled rectifier in an alternating current bridge 110. In this respect, the circuit differs from that of FIG. 1 in that it can be used to energize a relay rather than deenergize it.

Figure 3:
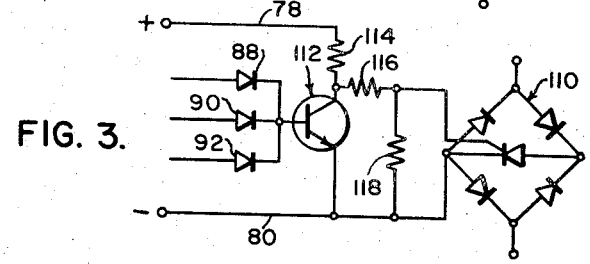
FIG. 3 is a schematic illustration of a portion of the circuit of FIG. 2 in which an avalanche transistor is substituted for the unijunction transistor as a switching element.

Still another embodiment of the invention is shown in FIG. 3 wherein elements corresponding to those shown in FIG. 2 are identified by like reference numerals. In In this case, however, the Schmitt trigger circuit 62 of FIG. 1 and the unijunction transistor 98 of FIG. 2 are replaced by an avalanche transistor 112 having its base connected to the cathodes of diodes 88–92, its emitter connected to lead 80, and its collector connected to lead 78 through resistor 114. The collector of avalanche transistor 112 is also connected to lead 80 through resistors 116 and 118, the voltage across resistor 118 being used to control a silicon controlled rectifier or the like in an alternating current bridge 110. Whenever the voltage on the base of transistor 112 exceeds a predetermined level, the transistor will switch on to cut off the silicon controlled rectifier in bridge 110. In this respect, the operation of the circuit is similar to that of FIG. 1.

Figure 5:
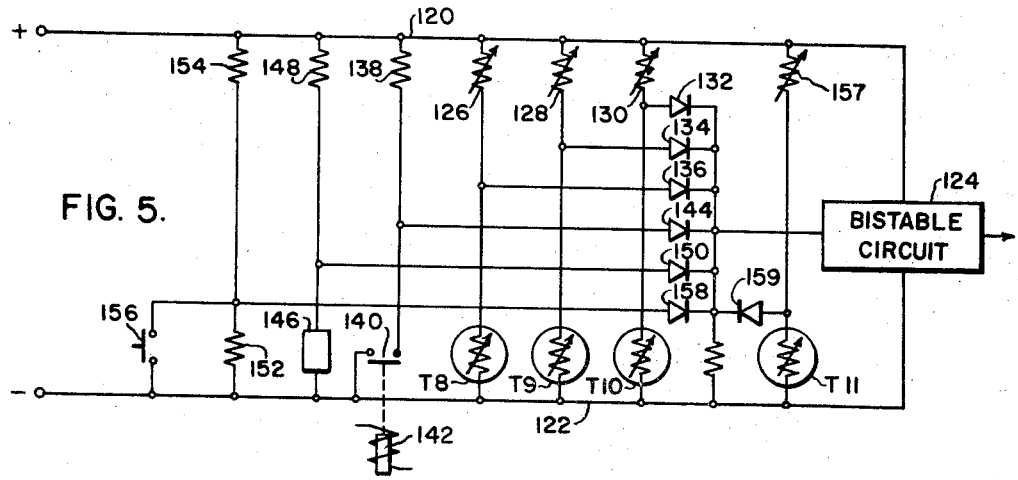
FIG. 5 illustrates another embodiment of the invention wherein off-normal conditions in addition to excessive temperature are sensed, and including reset means for preventing re-activation of the circuitry until the off-normal condition is corrected.

In FIG. 5, another embodiment of the invention is shown which again includes two power leads 120 and 122 and a bistable switching circuit 124 which may comprise, for example, either the Schmitt trigger circuit of FIG. 1, the unijunction transistor of FIG. 2 or the avalanche transistor of FIG. 3. In this case, three thermistors T8, T9 and T10 are again connected in effective parallel current paths with variable resistors 126, 128 and 130, respectively. The junction between each thermistor and its associated variable resistor, in turn, is connected to the input of a bistable circuit 124 through a diode 132, 134 or 136. In addition to the parallel current paths including the thermistors T8–T10, the circuit includes three additional effective parallel current paths, one of which includes a resistor 138 and normally closed contacts 140 of the relay 142. The relay 142, for example, may be utilized to control various functions of a machine by means of additional contacts, not shown; and it will be assumed that under normal operating conditions, the relay 142 should be energized. Should, however, an off-normal condition occur such that the relay 142 becomes deenergized, the contacts 140 will open, thereby presenting an open circuit condition to apply a high positive potential to the bistable circuit 124 through diode 144. Thus, it can be seen that in addition to an overtemperature condition, the circuit can also be used to indicate deenergization of a relay or other mechanical motion.

Still another condition which can be sensed is a rise in resistance of a photocell 146 connected in series with resistor 148 between the power leads 120 and 122. Assuming, for example, that the resistance of the photocell 146 is relatively low when light shines thereon, its resistance will increase to trigger the bistable circuit 124 through diode 150 when the light source is removed from the photocell. This arrangement may be used, for example, to sense an off-normal condition such as positioning of a member between the photocell and the light source.

With reference, again, to FIG. 4, it can be seen that a thermistor changes its resistance abruptly over a very small temperature range, identified as $\Delta t$, which may be as little as a few degrees.

Let us assume, for example, that the resistance of any one of the thermistors T8–T10 below the temperature $t_1$ is about 1000 ohms and that it requires a resistance of 2000 ohms in any one of the parallel current paths of FIG. 5 to cause the bistable circuit 124 to switch from one stable state to the other. Due to the hysteresis characteristics of the bistable circuit, it will not switch back to its original stable state until the resistance falls back to about 1000 ohms. This may be undesirable in certain cases where, for example, the condition causing overheating has not been corrected by the time the temperature of the thermistor falls to the point where its resistance is below about 1000 ohms and the bistable circuit switches back to its original state. In order to avoid a condition of this sort, the resistor 152 is added having a resistance in the example given of about 1500 ohms such that it normally will not trigger the bistable circuit 124 through diode 158. When, however, the resistance of any one of the thermistors T8–T10 rises above 2000 ohms, and then falls backwardly to something below 1000 ohms, the resistance of resistor 152 will maintain the total effective resistance at the input to the bistable circuit 124 at about 1500 ohms above the triggering level of the bistable circuit. Thus, once the bistable circuit 124 is triggered by an overtemperature condition, it will remain in the other of its two stable states. In order to reset the circuit, the pushbutton switch 156 can be depressed, whereupon a short circuit is effected across resistor 152 to lower the resistance to the point where the circuit 124 switches back into its original stable state.

The circuit of FIG. 5 may also include a current path between leads 120 and 122 including a thermistor T11 in series with a variable resistor 157, the junction of these two elements being connected to the input of bistable circuit 124 through diode 159. In this case, however, the thermistor T11 has a temperature-resistance curve of the type shown by the broken line 161 in FIG. 4. That is, its temperature-resistance curve has a rather gradual slope. Thus, by varying the resistance of resistor 157, the temperature at which the thermistor T11 will trigger the bistable circuit 124 can be varied over a wide range in contrast to conventional thermistors where the firing point of the bistable circuit 124 can be varied only within a very narrow temperature range. Alternatively, the thermistor T11 could be replaced by a tungsten wire or other device which exhibits a rather gradual increase in resistance with an increase in temperature, with the same overall effect. As will be understood, in an actual production model, the variable resistors associated with thermistors T1-T10 will normally be preselected to fire the bistable circuit at a predetermined temperature. However, in the case of thermistor T11, the resistor 157 must be variable to achieve the desired temperature variation.

Figure 6:
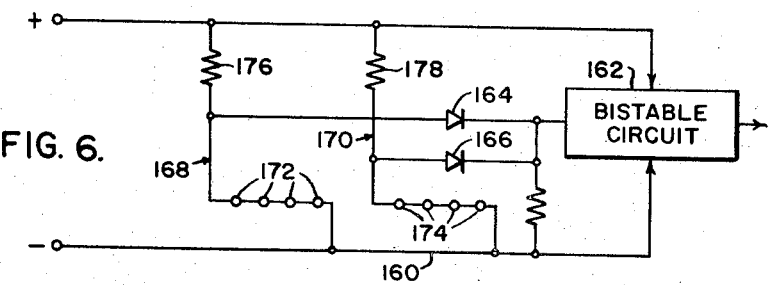
FIG. 6 illustrates an application of the invention for fire protection purposes.

In FIG. 6, an adaptation of the circuit for fire protection purposes is shown. This embodiment of the invention again includes two power leads 158 and 160 and an output bistable circuit 162 having its input connected through diodes 164 and 166 to two parallel current paths 168 and 170, respectively, connected between the power leads 158 and 160. In this case, however, each parallel current path includes a plurality of thermistors 172 or 174 connected in series with a resistor 176 or 178, as the case may be. The thermistors 172, for example, may be positioned over a furnace, while the thermistors 174 may be positioned at some other location within a building to sense the occurrence of a fire. The use of series-connected thermistors in each effective parallel current path enables the thermistors to be strung out over a larger area intended for protection against fire. At the same time, the advantages of parallel circuit operation, as to each area protected, are preserved.

The use of series-connected thermistors in a circuit arrangement such as that shown in FIG. 6 does not have the disadvantages of prior-art systems in which series-connected thermistors were used to deenergize a relay coil. As was previously explained, the effect of any one thermistor in a series string of such thermistors decreases as the total number of thermistors increases. This is particularly true in the case of a relay coil where relatively high changes in current are required to cause the relay to drop out. In the present invention, however, the relay coil is replaced by a bistable circuit which can be triggered in response to a very small change in current. It can be seen, therefore, that a single string of series thermistors can be used as in prior-art systems, but in the circuit arrangement of FIG. 6, to trigger a bistable circuit instead of a relay with much greater sensitivity.

Although the invention has been shown in connection with certain specific embodiments, it will be readily apparent to those skilled in the art that various changes in form and arrangement of parts may be made to suit requirements without departing from the spirit and scope of the invention. In this respect, it will be appreciated that negative temperature coefficient thermistors can be used in certain installations while incorporating the parallel circuit operation of the invention.

We claim as our invention:

1. In apparatus for actuating an alternating current relay in response to a rise in temperature above a predetermined temperature limit at any one of a plurality of locations, the combination of a plurality of temperature responsive impedance devices each positioned at a respective one of said locations and adapted to increase its impedance rapidly when its temperature rises above a predetermined limit, a plurality of parallel current paths connected between the output terminals of a source of energizing potential, each of said parallel current paths including an associated one of said temperature responsive impedance devices in series with an impedance element which is substantially insensitive to temperature variations, bistable circuit means having a pair of electron valves one of which is conducting while the other is nonconducting and vice versa, the states of conduction of said valves being reversed whenever the magnitude of an input signal rises above a predetermined level, unidirectional current means connecting the junction of the two impedance devices in each parallel current path to the input of said bistable circuit means, and solid-state alternating current switch means in series with said alternating current relay and connected to the output of said bistable circuit means such that the alternating current switch means will be actuated whenever the states of conduction of the valves in the bistable circuit means is reversed in response to an increase in the impedance of any one of said plurality of temperature responsive impedance devices.

2. The combination of claim 1 wherein said alternating current switch means comprises a bridge having a pair of parallel paths, each of said paths including a pair of diodes in series, a semiconductive controlled rectifier having its anode and cathode connected to the junctions of the diodes in the respective parallel paths, and means connecting the gate electrode of said semiconductive controlled rectifier to the output of said bistable circuit means.

3. The combination of claim 1 wherein at least one of said parallel current paths includes a plurality of temperature responsive impedance devices.

4. The apparatus of claim 1 wherein said bistable circuit means comprises Schmitt trigger circuit means having a pair of electron valves therein, one of said valves being conducting while the other is cut off and vice versa, the control electrode of one of said valves being connected to the junction of the two impedance devices in each parallel current path through said unidirectional current means.

5. The apparatus of claim 1 wherein each of said temperature responsive impedance devices comprises a resistance element having a relatively low temperature coefficient of resistance at normal temperatures and a much higher positive temperature coefficient of resistance when a predetermined higher temperature is reached.

6. The apparatus of claim 1 including an additional parallel current path connected between the output terminals of said source of energizing potential, a pair of resistors in series in said additional current path, a unidirectional current device connecting the junction of said last-named resistors to the input of said bistable circuit means, the resistance of one of said last-named resistors being lower than said temperature responsive impedance elements when said predetermined temperature is exceeded, and switch means for selectively providing a short circuit path around said one resistor.

7. The apparatus of claim 1 including an additional current path connected between the output terminals of said source of energizing potential, said additional current path having a constant impedance element in series with a device which presents an increase in impedance in response to an off-normal condition other than an overtemperature condition, and a unidirectional current device connecting the junction of said impedance element and said device to the input of said bistable circuit means.

References Cited

UNITED STATES PATENTS

| 3,262,014 | 7/1966 | Conner | 317—13 |
| 3,321,641 | 5/1967 | Howell | 317—41 |
| 3,328,639 | 6/1967 | Gryctko | 317—41 |
| 3,329,869 | 7/1967 | Obenhaus | 317—41 |

LEE T. HIX, *Primary Examiner.*

R. V. LUPO, *Assistant Examiner.*